M. PLAUT.
INSULATING CASE FOR SEED BREEDING AND INFECTION PURPOSES.
APPLICATION FILED SEPT. 18, 1920.
1,416,575. Patented May 16, 1922.
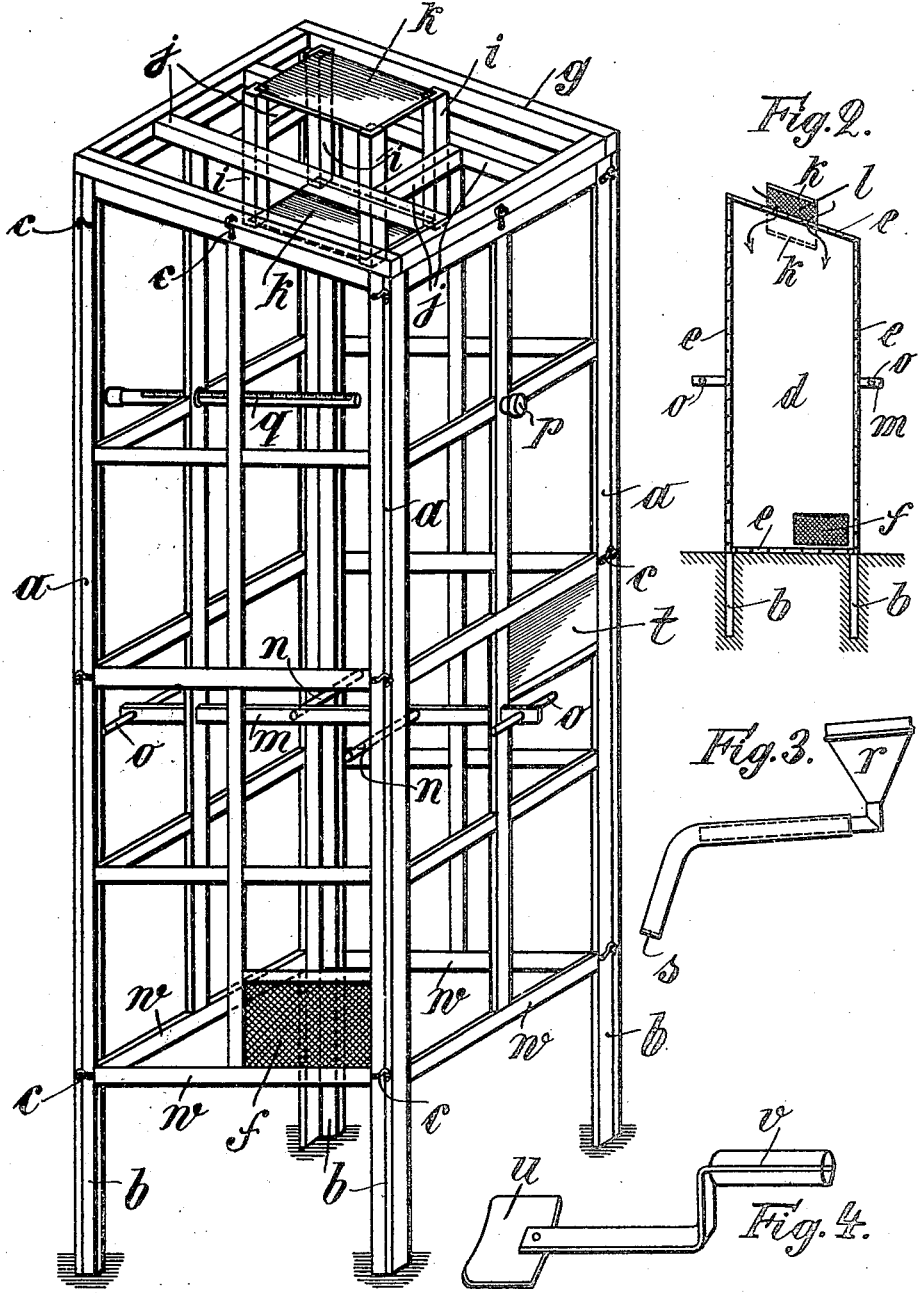

UNITED STATES PATENT OFFICE.

MENKO PLAUT, OF HALBERSTADT, GERMANY, ASSIGNOR TO FIRM OF: AUGUST KNOCHE-WALLWITZ, G. M. B. H., OF HALBERSTADT, GERMANY.

INSULATING CASE FOR SEED-BREEDING AND INFECTION PURPOSES.

1,416,575. Specification of Letters Patent. Patented May 16, 1922.

Application filed September 18, 1920. Serial No. 411,302.

*To all whom it may concern:*

Be it known that I, Dr. MENKO PLAUT, a citizen of the German Republic, and residing at Halberstadt, Germany, have invented certain new and useful Improvements in Insulating Cases for Seed-Breeding and Infection Purposes, of which the following is a specification.

This invention relates to improvements in insulating-cases for seed-breeding and infection purposes, and its object is to adapt said case to the plant-physiological and agricultural requirements in such a way that the seed produce of the plant is increased to the highest possible extent. First of all, the improved case is pollen-impermeable, so that a fructification by foreign pollen cannot take place. Furthermore, a sufficient illumination of the plant is allowed and its water supply is regulated. Besides, a shaking of the plant is attained in order to effect a fructification of the female blossom by a male blossom on the same plant without requiring an opening of the case. Furthermore, care is taken for a sufficient ventilation while the temperature in the case can be measured without opening the latter. Finally, a loosening of the earth around the plant in the case is possible, and the case itself is collapsible so that it can be easily transported.

In the accompanying drawing: Fig. 1 is a perspective view of the case, without its fabric cover; Fig. 2 shows the case with its fabric cover; Fig. 3 shows the irrigation-funnel; Fig. 4 shows the spade for loosening the earth.

The insulating-case comprises four wooden frames $a$, which are subdivided by longitudinal and transverse ledges and provided with feet $b$. Said frames are detachably connected by means of hooks and eyes $c$ so as to form the four side-walls of the case. The latter are covered by pergamin or vellum $d$ (Fig. 2) fixed thereto by wooden bars $e$ or the like. On one of said frames, a small space $f$, preferably in proximity to the bottom end thereof, is left free and covered by mull, gauze, batiste, or the like, which may be used in two or more layers in order to prevent foreign pollen from penetrating therethrough.

The upper end of the insulating-case is oblique for allowing rain-water to drain-off. In the middle of the roof $g$, which is also connected by means of hooks and eyes $c$ with the frames $a$, a ventilation-shaft is provided which with one half projects into the case and with the other half extends above the roof of the same. Said ventilation-shaft is fixed to the transverse ledges $j$ of the roof $g$ by means of bars $i$ and provided at its upper and lower ends each with a glass-sash $k$, through which the case is illuminated from above. The four side-walls $l$ (Fig. 2) of the ventilation-shaft are covered by a single, double, or multiple layer of mull or the like, and the space of the roof $g$ still left free is covered by oil-paper.

The insulating-case is so mounted in position that the side-wall containing the space $f$ faces the wind-direction. Through the mull coverings $f$ and $l$ air circulation takes place, so that an uninterrupted ventilation is provided.

Owing to any foreign pollen sucked by the wind-draught into the ventilation-shaft being compelled to penetrate twice through the mull coverings of the upper and lower parts of said shaft (see direction of arrows, Fig. 2) for entering the interior of the case, such penetration is practically impossible, the foreign pollen being in fact caught and collected on the glass bottom of said shaft, so that a foreign fructification of the plant in the case cannot take place.

In two oppositely located frames $a$, a slide $m$ is mounted, which in the interior of the case has two or more oppositely arranged arms $n$, so that by moving said slide to and fro by its outer handles $o$, the plant can be shaken by said arms and an auto-fructification of the plant is attained.

By means of a thermometer $q$ extending into the interior of the case, the temperature therein can be measured without opening the case.

Through a hole in one of the side-walls of the case, which can be closed by a stopper $p$, the plant can be irrigated from outside. Said irregation can be effected through a funnel $r$ having a rose $s$ on its telescopic outlet-pipe, which can be inserted through said hole in the side-wall of the case.

Through a window $t$ in one of the side-walls of the case, the plant therein can be inspected from outside.

For the purpose of loosening the earth around the plant in the case, a spade $u$ with bent handle v (Fig. 4), can be inserted through the space underneath the lowermost transverse ledges w of the case, the insulating-case being set into the earth up to said lowermost ledges w so that it encloses the plant from all directions, while insects cannot enter the interior of the case from below.

What I claim, is:—

1. In an insulating-case for seed-breeding and infection purposes, in combination, detachably connected pergamin-covered side-walls formed of wooden frames, an oblique roof covered with oil-paper and detachably connected with said side-walls, a mull-covered ventilation-shaft in the middle of said roof extending with one half below and with the other half above said roof, a glass-sash at the top and at the bottom of said shaft, a multiply mull-covered opening at the bottom end of one of said side-walls, and an inspection-window in one of said side-walls, substantially as and for the purpose set forth.

2. In an insulating-case of the type specified, in combination, a slide mounted in two oppositely located side-walls of the case, oppositely directed arms on said slide in the interior of the case, and two outer handles on said slide, substantially as and for the purpose set forth.

In testimony whereof I have hereunto set my hand in the presence of two subscribing witnesses.

Dr. MENKO PLAUT.

Witnesses:
 FRITZ GIESE,
 WILHELM WIEGANK.